United States Patent
Mueller et al.

(10) Patent No.: US 8,322,504 B2
(45) Date of Patent: *Dec. 4, 2012

(54) COMBINED POWER TRANSMISSION, DRIVE UNIT AND DRIVE TRAIN FOR A HYBRID SYSTEM

(75) Inventors: Bruno Mueller, Sasbach (DE); Thorsten Krause, Buehl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 575 days.

This patent is subject to a terminal disclaimer.

(21) Appl. No.: 12/512,449

(22) Filed: Jul. 30, 2009

(65) Prior Publication Data
US 2010/0038201 A1 Feb. 18, 2010

(30) Foreign Application Priority Data
Aug. 14, 2008 (DE) .......................... 10 2008 037 804

(51) Int. Cl.
*F16D 25/0638* (2006.01)
*B60K 6/387* (2007.10)

(52) U.S. Cl. ............... 192/85.25; 192/85.39; 192/106 F

(58) Field of Classification Search ............... 192/85.25, 192/106 F, 3.29, 3.3, 85.39; 477/5, 3
See application file for complete search history.

(56) References Cited

U.S. PATENT DOCUMENTS

| | | | | |
|---|---|---|---|---|
| 4,732,253 A * | 3/1988 | Hiramatsu et al. | ....... | 192/48.618 |
| 4,957,195 A * | 9/1990 | Kano et al. | .................. | 192/106 F |
| 5,172,799 A * | 12/1992 | Iijima et al. | ................. | 192/106 F |
| 5,226,517 A * | 7/1993 | Grochowski | ............... | 192/85.27 |
| 5,421,439 A * | 6/1995 | Hayasaki | .................... | 192/85.25 |
| 5,630,492 A * | 5/1997 | Yoshikawa et al. | ........ | 192/106 F |
| 5,662,198 A * | 9/1997 | Kojima et al. | ........... | 192/48.611 |
| 7,036,646 B2 * | 5/2006 | Yabe et al. | .................. | 192/106 F |
| 7,841,458 B2 * | 11/2010 | Schneidewind | ........... | 192/85.25 |
| 7,891,473 B2 * | 2/2011 | Maienschein et al. | ......... | 192/3.3 |
| 2005/0224309 A1* | 10/2005 | Duwel | ........................ | 192/106 F |
| 2010/0062899 A1* | 3/2010 | Engelmann et al. | ............ | 477/86 |
| 2010/0084238 A1* | 4/2010 | Mueller et al. | ............... | 192/3.29 |

FOREIGN PATENT DOCUMENTS
DE 10310831 11/2003

* cited by examiner

*Primary Examiner* — David D Le
*Assistant Examiner* — Lillian Nguyen
(74) *Attorney, Agent, or Firm* — Simpson & Simpson, PLLC

(57) ABSTRACT

A combined power transmission and drive unit for the application in drive trains in hybrid systems with at least two prime movers that can be coupled via a power transmission unit with a consumer, in particular transmission. Between a first prime mover and the power transmission unit, a device is provided for connecting/disconnecting the power flow between the latter and the power transmission unit, including a friction clutch that can be actuated by a pressure medium, including a first clutch part and a second clutch part which can be brought in active connection with one another via a servo unit featuring a piston element that can be pressurized by a pressure medium. A combined power transmission and drive unit according to the invention, with control of a rotation speed difference of a flow medium on either face side of a piston element.

16 Claims, 3 Drawing Sheets

COMBINED POWER TRANSMISSION, DRIVE UNIT AND DRIVE TRAIN FOR A HYBRID SYSTEM

CROSS-REFERENCE TO RELATED APPLICATIONS

This patent claims priority of German Patent Application No. 10 2008 037 804.6, filed on Aug. 14, 2008, which application is incorporated herein by reference.

FIELD OF THE INVENTION

The invention relates to a combined power transmission and drive unit for application in drive trains in hybrid systems with at least two prime movers that can be coupled with a consumer via a power transmission unit, in particular a transmission. Between a first prime mover and the power transmission unit a mechanism is provided for connecting/disconnecting the power flow between the latter and the power transmission unit. The mechanism includes a friction clutch with a first clutch part and a second clutch part, which can be brought in active connection with one another via a servo unit featuring a piston element that can be activated with pressure medium.

The invention further relates to a drive train for a hybrid system, in particular for application in vehicles.

BACKGROUND OF THE INVENTION

Hybrid systems for the application in vehicles are taught in a number of embodiments in the prior art. Common in all is that in the drive train at least two different prime movers are provided, through which the drive can occur selectively or jointly. At the same time, at least one of the prime movers is designed such that it is generally capable, in fuel cutoff operation and/or in the brake operation, of converting the mechanical energy into a different form of energy and feeding the energy to an accumulator unit and/or to a consumer. To do that, in particular, the second prime mover is designed in the form of an electrical machine suitable to feed the electric energy into an accumulator during generator operation. Such a hybrid system, for instance, is taught in the prior publication DE 103 10 831 A1, FIG. 30. This discloses a power transmission unit that is disposed between two prime movers and a downstream consumer in the form of a transmission unit. Furthermore, a device for disconnecting/connecting the power flow, in particular, in the form of a selectable clutch device is provided for selective coupling of the power transmission unit with one of the prime movers at least between this one prime mover and the power transmission unit. The clutch device is also designated as prime mover clutch or separating clutch. The second prime mover is designed as an electric machine in which the armature is connected non-rotatably with the power transmission unit. The power transmission unit comprises a hydrodynamic component and a device for at least partial bypass of the power flow via the hydrodynamic component. This is preferably done in the form of a selectable clutch device that is also designated as lock-up clutch and that enables bypassing the hydrodynamic component in power flow.

Such a start-up and power transmission unit formed by power transmission unit and selectable clutch device as well as a prime mover is operable in different modes. In particular, upon disconnection of the power flow between the prime mover and the power transmission unit when driving by means of the electric machine in the "electric drive" mode of operation, the selectable clutch device in the form of prime mover clutch is in the—open—position. However, a part of the operating medium and/or control medium is still contained in the pressure chamber allocated to the piston element, so that, owing to the connection of the piston element to the input of the power transmission unit, which, in this operating state, is concurrently driven via the electrical machine, a rotating ring for operating and/or controlling medium, in particular an oil ring, sets in. This acts on the selectable clutch device, in particular on the pressure-chamber-limiting face of the piston element and generates an axial force that in general is greater than the force that sets in on the piston face side towards the clutch. In the inconvenient case, this can lead to unintentional closure of the selectable clutch device and cause disadvantageous effects on drive responses, which, in particular, are characteristic of undesired dragging of connected elements coupled with the first clutch part.

BRIEF SUMMARY OF THE INVENTION

The invention is therefore based on the task to improve a combined power transmission and drive unit of the kind mentioned above. This occurs in a manner that on the one hand improves the selection behavior of the selectable clutch device, in the form of prime mover clutch, especially in a configuration with an actuating device that can be pressurized with arbitrary pressure, as well as reduction of hydrodynamic influences on the selectable clutch device, in particular, in the mode of operation with an opened selectable clutch device, which can lead to automatic closure of the latter, and is achieved particularly with simple means and freely of modifications in the control of clutch actuation.

Power transmission and drive unit according to the invention, is for application in drive trains in hybrid systems with at least two prime movers, which can be coupled with a consumer via a power transmission unit, in particular transmission. Between a first prime mover and the power transmission unit a device for connecting/disconnecting the power flow between the latter and the power transmission unit is provided, comprising a friction clutch with a first clutch part and a second clutch part, which can be actuated with pressure medium, and can be brought in active connection with a piston element that can be pressurized with pressure medium, wherein, the means are provided for controlling the rotary velocity difference, by means of flow medium on both face sides of the piston element.

The solution according to the invention enables effective shielding of the piston element of the servo-unit, allocated to the selectable clutch, from axial forces resulting from the hydrodynamic effects, in particular, by reduction or compensation of the axial force resulting through this and the displacement of the piston element support on a different connection element, with elements simply executed in the selectable clutch device, in particular, elements that can be integrated in a wet clutch, free of additional modification for individual subassemblies and control of clutch actuation.

The means for controlling the rotary velocity difference of the flow medium on both sides of the piston element, in the simplest case, comprise an influence element rotatable at synchronous rotation speed with the piston element of the servo unit and in the radial direction it is located away from the piston element of the shifting device of the selectable clutch by forming a further second pressure chamber towards the piston element. The controlling element can have different embodiments. It is decisive that through the flow medium present in the interstice formed between the controlling element and the piston element, a dragging effect is generated, which spends the rotational speed of the flow medium on the piston's rotational speed.

The controlling element can be formed, in accordance with one embodiment, as a disc-shaped or ring disc-shaped element, or it is formed in the form of a piston element that features a fully closed surface in the circumferential direction. To ensure that the rotational speed is synchronous, the controlling element is non-rotatably connected with the piston element of the servo unit of the selectable clutch device or the respective element is connected non-rotatably with respect to the latter, for example, movably in the axial direction and is supported on a connection element in axial direction. Through the support on a connection element formed by an arbitrary component of the selectable clutch device, with exception of the piston element of the servo unit, the piston element of the servo unit can be kept free from bearing the axial forces. The controlling element is non-rotatably connected and supported in one embodiment with a hub connected with the piston element of the servo unit of the selectable clutch device.

The controlling element is spatially disposed on the face of the piston element of the servo unit facing away from the pressure chamber for activating the piston element of the servo unit near the piston. The controlling element is disposed between the two clutch parts of the selectable clutch device in axial direction and the piston element of the servo unit and is guided in a radial direction, pressure tightly, on the piston element of the servo unit. In that way, it is ensured that the centrifugal oil effect in the pressure chamber resulting from the disposition of the controlling element can be fully used for the compensation of centrifugal oil effect in the pressure chamber on the opposite, effective piston face side.

The non-rotatable connection of the controlling element with the piston element of the servo unit can be form-closed or force-closed. Concrete embodiment is provided, depending on the assembly situation and on joint surfaces at disposal, for example, in the internal circumference area or external circumference area of the controlling element.

In one embodiment, the controlling element is free of direct coupling with the piston element, so that no support of the axial forces on the piston element is provided. The controlling element is thereby connected non-rotatably with an element that is non-rotatably coupled with the piston element.

The axial support of the forces, in particular the forces to be compensated via the controlling element occur, in one embodiment, via an axial bearing that is provided between the controlling element and a connection element. The axial bearing comprises at least a roller bearing, for example, a needle bearing or a plain bearing, including at least a supporting ring.

The support thereby is provided either on the first clutch part of the selectable clutch device or on an element on the side of the first prime mover connected with the latter. In one embodiment, support is provided only in axial direction, free of a relative rotational speed between the controlling element and connection element on an element that is connected non-rotatably with the piston element of the servo unit of the selectable clutch device; as a connection element it must therefore be designed for axial forces only.

The connection of the piston element, of the servo unit of the selectable clutch device, to the power transmission unit is provided by non-rotatable connection with the second clutch part or by direct coupling with the input of the power transmission unit. The second clutch part and the input of power transmission unit can also be formed by the same component.

The input of power transmission unit can thereby surround the bell housing, at least the power transmission unit, for example, also the selectable clutch device in the form of an prime mover clutch and be formed by this or by non-rotatably coupled walls between the selectable clutch device and the power transmission unit for limiting the pressure chambers of the selectable clutch device and power transmission unit. Thus, the number of components can be kept at minimum and the concentration of functions be increased on a few components.

A multiple number of possibilities exist with respect to the structure of the power transmission unit itself. This comprises, for example, a hydrodynamic component and a device for bypassing the hydrodynamic component in the power flow, wherein, for example, the power transmission unit and the selectable clutch device can be supplied with pressure medium for a common operating medium control and guiding system. The power transmission unit can be executed at least as a dual- or triple duct unit. In the first case, this comprises at least two connections, a first connection is coupled with a work chamber of the hydrodynamic component and a second connection is limited by a housing on the external circumference of the hydrodynamic component and is coupled with a chamber that can be filled with operating medium. In the embodiment, as triple duct unit, a further third coupled connection is provided with a chamber allocated on the piston element and can be pressurized with pressure medium.

The power transmission according to the invention and drive unit, for example, is suitable for the application in hybrid systems, whose first prime mover is formed by an internal combustion engine and whose second motor is formed by an electrical machine that can be operated either as a motor or as a generator. Other drive concepts for connection of the first and/or second prime mover are likewise possible.

BRIEF DESCRIPTION OF THE SEVERAL VIEWS OF THE DRAWING

The solution according to the invention is explained in the following figures.

DETAILED DESCRIPTION OF THE INVENTION

Figure 1:
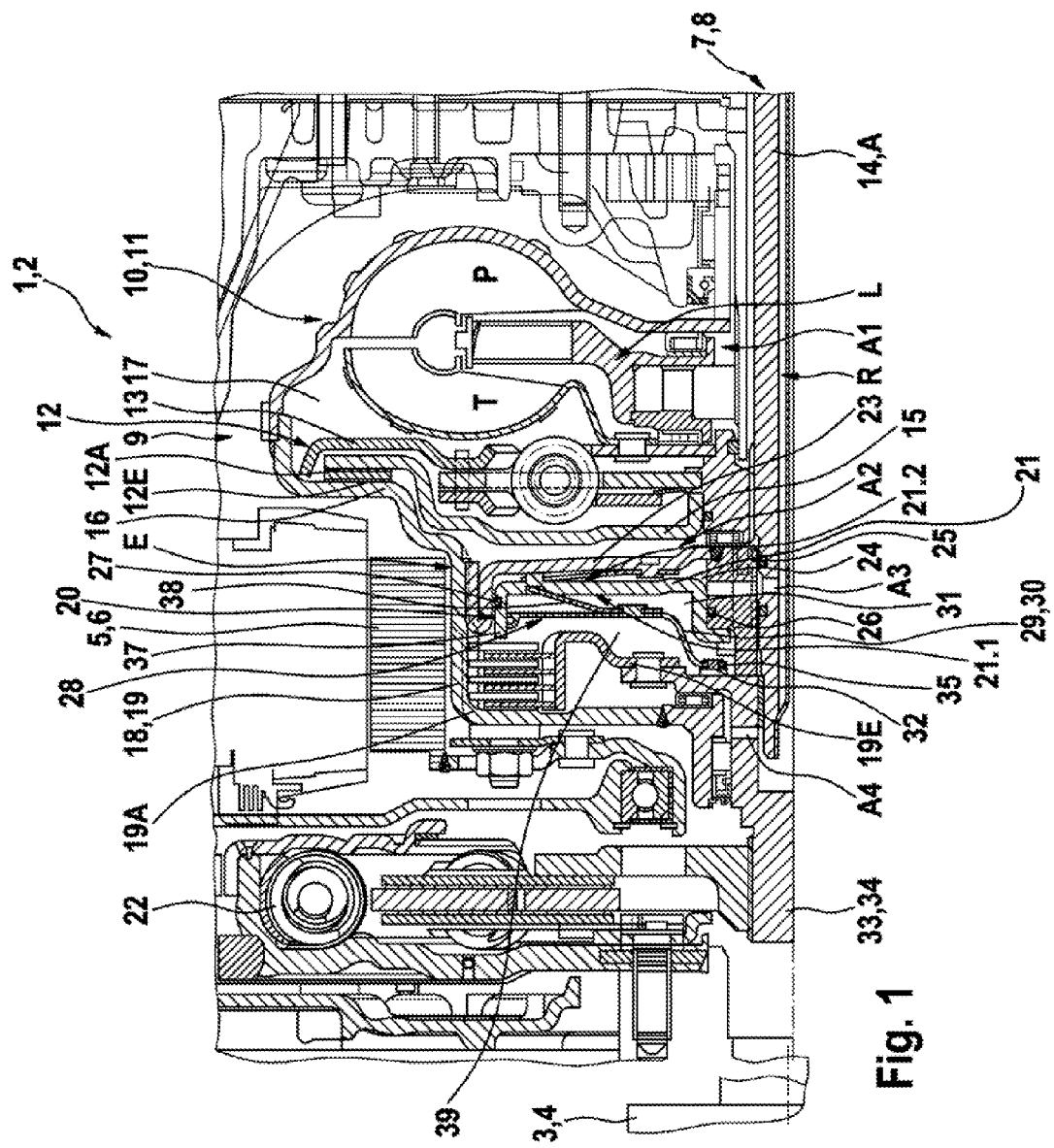
FIG. 1 illustrates a configuration and embodiment of a controlling element in a part of an axial section of a combined power transmission and drive unit for the application in hybrid systems

FIG. 1 is a schematically simplified illustration of basic design and function of an embodiment of a combined power transmission and drive unit 1 according to the invention, as it can find application in drive trains for hybrid systems 2. Unit 1 is disposed between a first prime mover 3, for example, in the form of an internal combustion engine 4 and a downstream transmission 8 as a consumer 7. Furthermore, a further second prime mover 5 is provided, for example, in the form of an electric machine 6 that can be operated as generator and as motor.

The individual prime movers 3 and 5 are coupled with the transmission 8 via a power transmission unit 9, including at least one hydrodynamic component 10 that in the depicted case is, for example, provided as a hydrodynamic rotation speed/torque converter 11. This serves for concurrent conversion of rotation speed and torque in a predefined ratio. The hydrodynamic rotation speed/torque converter 11 comprises at least a primary wheel acting in the power flow between one of the prime movers 3 and 5 and the transmission 8 as an impeller P and a secondary wheel acting as a turbine wheel T and at least a reaction member in the form of a stator L that can be non- or rotatably mounted. Furthermore, it is also possible to form the hydrodynamic component 10 as a hydrodynamic clutch. In this case, it is free from a stator and only serves for rotational speed conversion with unchanged transmission torque. The power transmission unit 9 further comprises a selectable clutch device 12 for bypassing the hydrodynamic component 10 in the power flow. The selectable clutch device 12 comprises at least a first clutch part 12E that is non-rotatably connected with the input E of the power transmission unit 9 at least indirectly or forming the latter, and a second clutch part 12A that is at least non-rotatably connected indirectly with the output A of the power transmission unit 9. In the depicted case, the coupling occurs via a device 13 for damping of vibrations, which acts as an elastic clutch between the second clutch part 12A and the output A of the power transmission unit 9. The output A of the power transmission unit 9 is formed, for example, in the depicted case by a transmission input shaft 14 or is non-rotatably coupled with said element. The term shaft is to be understood functionally and consists of a rotatable component, wherein this can be formed as a solid or hollow shaft. For the actuation of selectable clutch device 12 at least a servo unit 15 is provided, which, for example, comprises a piston element that can be actuated by means of a pressure medium. The selectable clutch device 12 is, for example, provided as friction clutch in disc design.

Figure 2:
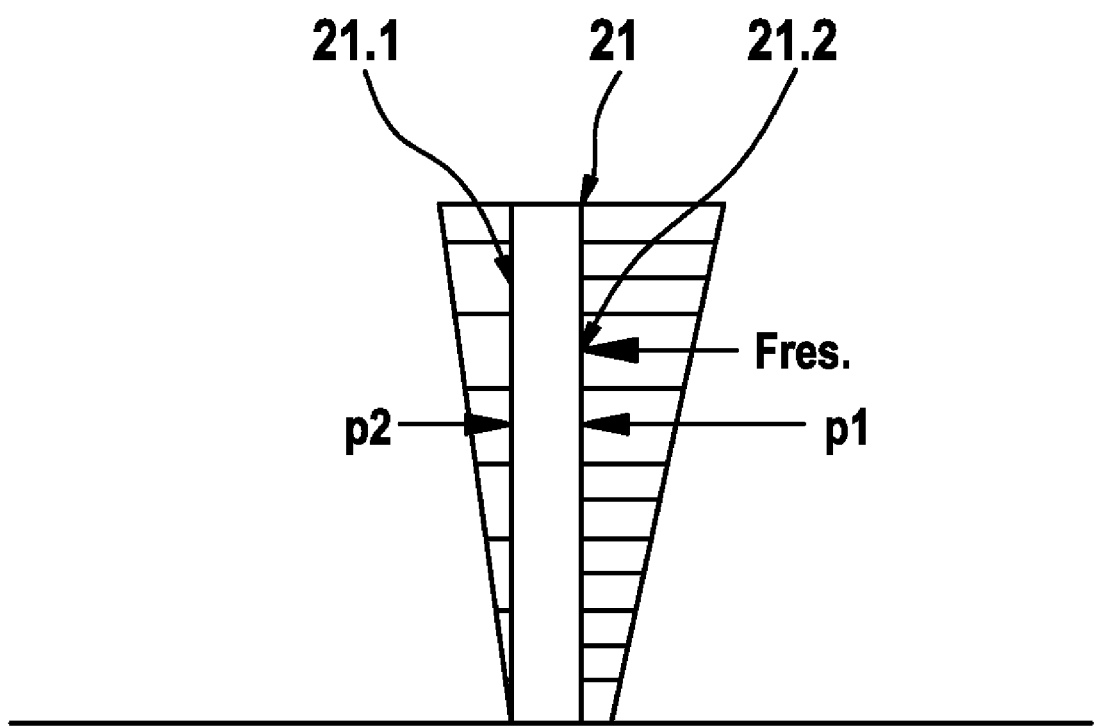
FIG. 2 illustrates pressure conditions that adjust on a servo unit in accordance with the prior art, in a schematically substantially simplified illustration.

Moreover, also the impeller P of the hydrodynamic component 10 is non-rotatably connected with the input E of the power transmission unit 9 or forms the latter. In the depicted case, the input E of the power transmission unit is formed by bell housing 16 that is connected non-rotatably with an impeller shell of the impeller P and the selectable clutch device 12 as well as the device 13 for damping vibrations surrounds it both in radial as well as in axial direction, by forming an internal chamber 17. Furthermore, the depicted power transmission and drive unit 1 comprises a device 18 for selectively connecting or disconnecting the power flow from the first prime mover 3 to the power transmission unit 9 and thus for connecting or disconnecting the latter from the drive train. The device 18 comprises a selectable clutch device 19, preferably in the form of a frictional clutch device with a first clutch part 19E, at least indirectly, i.e. directly coupled or coupled via further transmission elements, for instance, such as a device 22 for damping vibrations in the first prime mover 3 and a second clutch part 19A connected with the input E of the power transmission unit 9, wherein both can be brought in active connection, at least indirectly, with one another. At the same time, each of the individual clutch parts 19E and 19A comprises at least an element carrying and/or forming a frictional surface. Under the elements that carry and/or form a frictional surface, one understands components that can be constituent parts of a frictional pair, wherein the individual friction surface participating in a frictional pair is respectively pointing to one another in axial direction, at least over a part of the axial face surface of the two adjacently disposed frictional surface carriers and/or frictional surface elements, either directly by the respective element without additional cover or indirectly by coating being formed on the lining or coating. The selectable clutch device 19 can be actuated by means of a pressure medium and as such comprises a servo unit 20 that comprises at least one piston element 21 that can be activated by the pressure medium, which brings the individual elements carrying and/or forming frictional surfaces in the form of discs of the individual clutch parts 19E and 19A with one another in active connection by applying an appropriate contact force for generating the frictional grip. The first clutch part 19E is at least indirectly connected non-rotatably with the prime mover 3, wherein the connection can be established directly or indirectly via further transmission elements; in the depicted case, a further device 22 for is provided for damping vibrations. Also, the device 18 features housing that is non-rotatably connected with or forms the input E of the power transmission unit 9, preferably in the form of the bell housing 16. The second clutch part 19A is non-rotatably connected with the input E of the power transmission unit 9, thus, it is formed by discs on the external disc carrier, wherein, the disc carrier is on the input E of the power transmission unit 9, in particular in can form the bell housing 16 or be connected with it non-rotatably. In a single-part embodiment of the bell housing 16 surrounding both the selectable clutch device 12 as well as the selectable clutch device 19, a pressure chamber limit 23 is additionally provided in the form of a wall that partition the chambers or spaces, which can be pressurized by the pressure medium, which are hereinafter designated briefly as pressure chambers of the selectable clutch device 19 of the power transmission unit 9. The piston element 21 of the servo unit 20 of the selectable clutch device 19 is guided in a pressure-tight manner for the formation of a pressure chamber 24 for pressurizing the piston element 21 on its piston face side 21.2 on the second clutch part 19A of the element facing away from individual clutch parts 19E and 19A and towards the power transmission unit 9 or connected with it non-rotatably, for example, with the input E of the power transmission unit 9. The pressure chamber 24 in the depicted case is limited by the piston element 21 and the pressure chamber limit 23. The piston element 21 is connected non-rotatably with the second clutch part 19A or with an element connected non-rotatably with the latter; in particular, it is connected with the input E of the power transmission unit 9. The connection occurs in the depicted case with the pressure chamber limit 23 via a spring element, which allows motion relative to one another in axial direction. Furthermore, in the internal circumference area, the piston element 21 is guided in axial direction along the hub 25 that is connected non-rotatably with the pressure chamber limit 23. The guide can be provided with an angular deflection limit in circumferential direction. This pressure chamber 24 can be pressurized or relieved by pressure medium to actuate the selectable clutch device 19, wherein the contact force of the piston element 21 is variable via the magnitude of the pressure. The piston element 21 is further displaceable in axial direction on the second clutch part 19A or is guided in the input E of the power transmission unit 9. In the depicted case, the piston element 21 is guided in radial direction around its external circumference and hence in the radial external extension of the pressure chamber limit 23 and in radial direction within its internal circumference on a hub 25 connected non-rotatably with the pressure chamber limit 23. On these elements, the pressure- and liquid-tight guide is further provided respectively between the piston element 21 around the external circumference and the input E of the power transmission unit 9 or a first sealing device 27 is disposed around the pressure chamber limit 23 and a further sealing device 26 is disposed within the internal circumference of the piston element 21 and the hub 25. The sealing devices 26, 27 are preferably formed respectively as contact seals. Since the selectable clutch device 19 involves a wet clutch, it is always filled with operating medium, in particular oil, and it runs in oil, wherein the oil is concurrently used also for cooling purposes. At the same time, different pressures adjust on either side of the piston element 21, in particular on the piston face side 21.2 towards the power transmission unit 9 and on the face 21.1 towards the selectable clutch device 19 owing to the rotating media in the case of driven housing. For example, in the combined power transmission and drive unit 1 "Electric drive," mode of operation that is characteristic by disconnecting the first prime mover 3 from the power transmission unit 9 and hence fully opening of the selectable clutch device 19, the states of flow on the piston element 21, exemplarily depicted in FIG. 2, adjust owing to the flow conditions formed in both the pressure chamber 24 and internal chamber 39. As already implemented, since the pressure chamber 24 that can be pressurized by the pressure medium is limited by the piston element 21, in that it is guided pressure- and liquid-tightly on the input E of the power transmission unit 9 and hence on the bell housing 16 or it is guided non-rotatably with this coupled element and non-rotatably coupled with it, the piston element 21 rotates with a rotation speed identical to that of the input E of the power transmission unit 9, which is driven via the electrical machine 6 in this operating state. Between this and the piston element 21, a certain centrifugal oil-pressure-profile of the flow medium adjusts inside the pressure chamber 24 depending on the rotation speed provided by an oil ring rotating in unison. The first clutch part 19E of the selectable clutch device 19 is decoupled from the prime mover 3 and stands still. Owing to the difference in rotation speed between this and the piston face side 21.1 opposite the pressure chamber 24, a further centrifugal oil pressure profile adjusts for the flow medium remaining inside the internal chamber 39. The centrifugal oil pressure profiles on both face sides cause different magnitudes of pressure on the piston face sides 21.1 and 21.2 facing away from one another, wherein p1 corresponds to the pressure on the piston face side 21.2 and p2 corresponds to the pressure on the face 21.1, from which a resultant axial force Fres is created on the piston element 21 in the actuation direction "closure," which leads to a self-closing effect or also leads to selection problems with the selectable clutch device 19. The centrifugal force effects of the rotating operation medium masses are decisive, in particular oil masses on either side of the face sides 21.1 and 21.2 of the piston 21. These centrifugal-force effects caused by the rotating medium masses are more difficult to control, when the rotation speed ratios between the first clutch part 19E and the piston element 21 change. Therefore, according to the invention, the means 28 for controlling the rotary velocity difference of the flow medium or media are provided on both sides of the face sides 21.1, 21.2 of the piston element 21. In the simplest case, this comprises a controlling element 29 that is, for example, formed as a disc-shaped element in the form of a further piston element 30, through which the axial force is exerted on a connection element 33, for example, either on the first clutch part 19E of the selectable clutch device 19 or on an element non-rotatably coupled with it or on the input E of the power transmission unit 9, freely of support on the piston element 21. For this, the controlling element 29, viewed in axial direction in the mounted position between the prime mover 3 and motor 5 and the power transmission unit 9, between the clutch parts 19E and 19A of the selectable clutch device 19 and the piston element 21, is spatially disposed as close as possible and runs synchronously at the rotation speed of the piston element 21. The operating medium between the piston element 21 and the controlling element 29, for example, the piston element 30, is synchronized to the rotation speed of piston element 21 by the dragging effect. The piston element 30 is thereby at least indirectly connected non-rotatably with the piston element 21 and guided pressure-tightly on the latter, under the formation of a further second pressure chamber 31 on the face side 21.1 of the piston element 21 facing away from the pressure chamber 24 at least in the external diameter area or external circumference 37. The pressure- and liquid-tight guide is provided in the external circumference area 37 of the piston element 30 on the piston element 21, in the depicted case on a partial section of the piston element 21 forming an internal circumference. The non-rotatable coupling can be provided in different ways. In the depicted case, the non-rotatable connection of the piston element 30 is provided directly with the piston element 21 and is formed such that at least a relative motion of the piston element 30 is possible in axial direction relative to the piston element 21. However, in the circumferential direction the piston element 30, it can rotate with the piston element 21 freely at a relative rotational speed. The means 38 for non-rotatable connection comprise a spring element, with predefined prestressing force, disposed between the piston face side 21.1 and the piston element 30, for example, a disc spring that is connected with the piston element 30, for example, non-detachably via a form-closed connection in the form of a rivet, and the end is connected with the piston element 21, for example, a form-closed by attachment to driving-dog elements, for instance noses aligned radially.

In the area of the internal circumference 32 of the piston element 30, the latter is supported on a connection element 33 that is formed by the first clutch part 19E of the selectable clutch device or formed by a non-rotatably coupled element, here the input hub 34 in accordance with the embodiment in of FIG. 1. Between the piston element 30 and the input hub 34, an axial bearing device 35 is provided, which can be formed in different ways. The application of roller or plain bearings is considerable. In one embodiment, bearings with small assembly space are used, for example, needle bearings, or simple supporting rings also find application.

FIG. 1 illustrates an embodiment of a solution according to the invention, with an additional controlling element 29 for preventing a resultant axial force on the piston element 21, as apparent, for example, in a drive via the second prime mover 5 and the decoupling and hence operating state "open" of the selectable clutch device 19 due fill-up with flow medium. This can under certain circumstances lead to unintentional closure of the selectable clutch device 19, which is avoided in an additional piston element 30 and the dragging effect associated with it.

Figure 3:
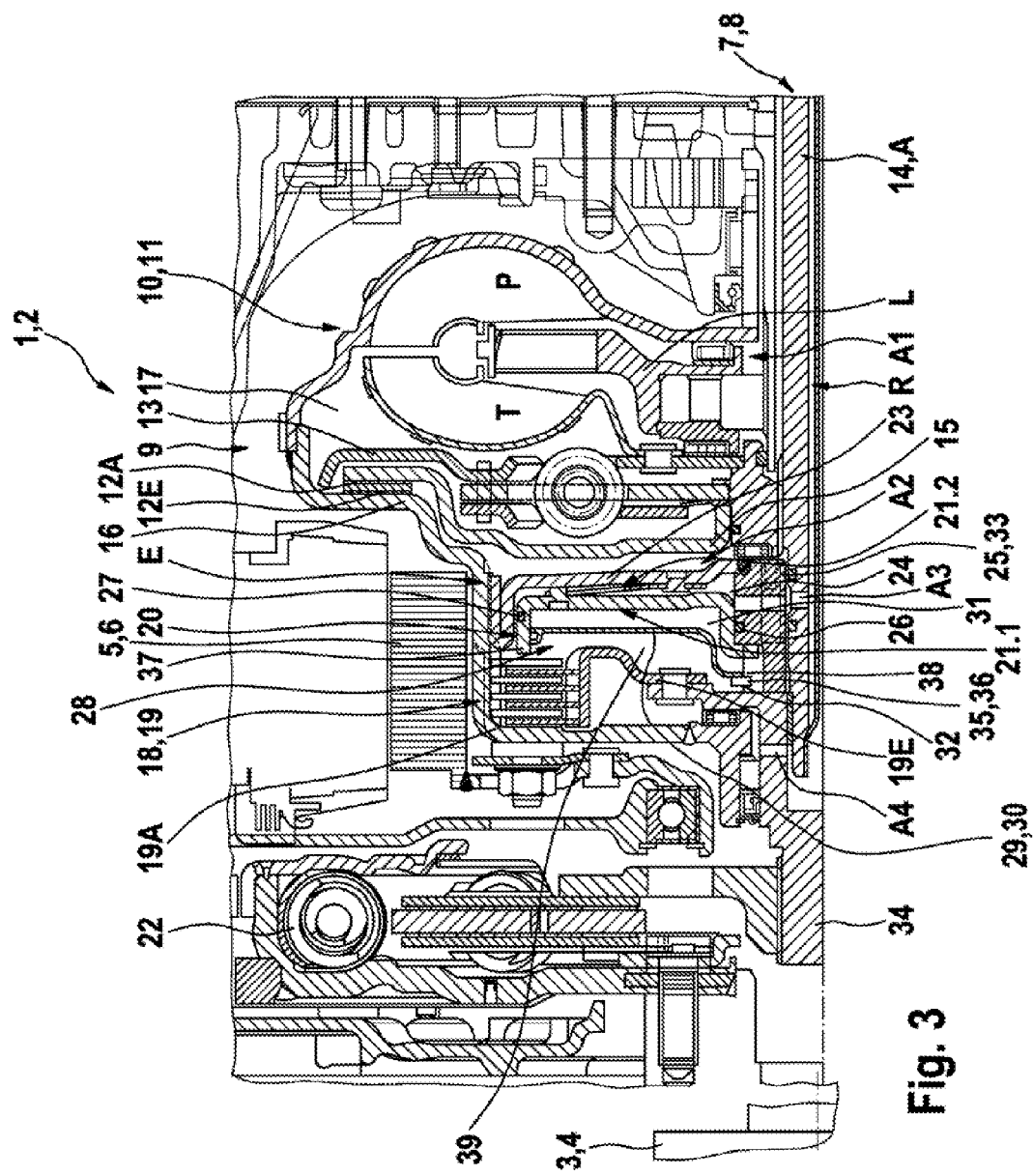
FIG. 3 illustrates a configuration and embodiment of a controlling element in a part of an axial section of a combined power transmission and drive unit for the application in hybrid systems.

FIG. 3 illustrates an embodiment in accordance with FIG. 1 with an alternative connection between the piston element 30 and the piston element 21 and a support in axial direction. At the same time, non-rotatable coupling is provided between the piston element 30 and the piston element 21 via the respective coupling with clutch hub 25 that is connected non-rotatably with the input E of the power transmission unit 9. The means 38 for non-rotatable connection between the piston element 30 and hub 25, for example, comprise splines running in axial direction and guided in radial direction on the hub 25, in active connection with complementary splines in the internal circumference area 32 of the piston element 30. In addition, here, the pressure-tight guide of the piston element 21 is provided in the external circumference area 37 of the piston element 30. The axial bearing 35 is provided in the area of internal circumference 32 of piston element 30 on connection element 33 in the form of hub 25. The support in axial direction is provided here exemplarily via a spring ring 36 connected with the connection element 33.

In the embodiments described in FIGS. 1 and 3 of the combined drive and power transmission unit 1, a four-duct embodiment is exemplarily involved, in which the power transmission unit 9 is characterized by two connections A1 and A2, whereas two further connections of the selectable clutch device 19 are provided. The connection A3 is coupled with the pressure chamber 24 and the connection A4 is connected with the rest internal chamber 39. The connection A1 of the power transmission unit 9 is connected with the work chamber of the hydrodynamic component 10, and the second connection A2 is connected with the hydrodynamic component outside the external circumference and the internal circumference of the bell housing 16 or internal chamber 17 confined by the pressure chamber limit 23. Coupling in axial direction is disposed between the face 21.1 of piston element 21 facing away from the hydrodynamic component and the input E of power transmission unit 9. On the one hand, the hydrodynamic component can be pressurized centripetally or centrifugally depending on the pressure differences control. In the centripetal flow, the operation medium is routed from the external circumference of the hydrodynamic component 10 into the work chamber of said component, thus keeping the selectable clutch device 12 open and thereby routes the operating medium flow into the external cooling circuit, whereas in the centrifugal flow, the selectable clutch device 12 is closed.

LIST OF REFERENCE SYMBOLS 1 drive and power transmission unit
2 hybrid unit
3 first prime mover
4 internal combustion engine
5 second prime mover
6 electrical machine
7 consumer
8 transmission
9 power transmission unit
10 hydrodynamic component
11 hydrodynamic rotation speed/torque converter
12 selectable clutch device
12E first clutch part
12A second clutch part
13 device for damping of vibrations transmission
14 input shaft
15 servo unit
16 bell housing
17 internal chamber
18 device for connecting/disconnecting the power flow from the first prime mover to power transmission unit
19 selectable clutch device
19E first clutch part
19A second clutch part
20 servo unit
21 piston element
21.1 piston face side
21.2 piston face side
22 device for damping vibrations
23 pressure chamber limit
24 pressure chamber
25 hub
26 sealing device
27 sealing device
28 means for non-rotatable connection
29 controlling element
30 piston element
31 second pressure chamber
32 internal circumference of the piston element
33 connection element
34 input hub
35 axial bearing
36 spring ring
37 external circumference of the piston element
38 non-rotatable connection
39 internal chamber
E input of the power transmission unit
A output of the power transmission unit
P impeller
turbine wheel
T
L stator
p1, p2 fres pressure force
R rotation axis
A1-A4 connections

What we claim is:

1. A combined power transmission and drive unit (1) for application in drive trains in hybrid systems (2) with at least two prime movers (3, 5), which can be coupled via a power transmission unit (9) with a transmission (8), wherein between a first prime mover (3) and the power transmission unit (9) a device (18) is provided for connecting/disconnecting the power flow between the latter and the power transmission unit (9), comprising a friction clutch device (19) with:
   first and second pluralities of clutch plates;
   a first clutch part (19E);
   a second clutch part (19A);
   a servo unit (20), including at least one piston element (21) axially displaceable to close the friction clutch; and,
   a controlling element (29):
      connected with the first clutch part such that rotation of the controlling element is locked to rotation of the first clutch part;
      with a radially outermost end with a pressure-tight engagement with the at least one piston element; and,
      rotatable with respect to the at least one piston element, wherein:
         respective radially innermost portions of the first plurality of clutch plates are connected to the first clutch part and,
         radially outermost portions of the second plurality of clutch plates are connected to the second clutch part.

2. The combined power transmission and drive unit (1) according to claim 1, wherein the controlling element (29) in synchronous rotation with the rotation speed of the at least one first rotatable piston element (21) and at a distance from the at least one piston element (21) in radial direction by forming a further, second, pressure chamber (31) extending to the at least one piston element (21).

3. The combined power transmission and drive unit (1) according to claim 2, wherein the controlling element (29) in axial direction is disposed between the two clutch parts (19E, 19A) of the selectable clutch device (19) and the piston element (21) of the servo unit (20) and is guided pressure-tightly on the piston element (21) of the servo unit (20) in radial direction.

4. The combined power transmission and drive unit (1) according to claim 2, wherein the controlling element (29) is formed as sheet metal component.

5. The combined power transmission and drive unit (1) according to claim 1, wherein an axial bearing (35) is disposed between the controlling element (29) and an input hub (34).

6. The combined power transmission and drive unit (1) according to claim 5, wherein the axial bearing (35) features at least a needle bearing or a plain bearing, including at least a supporting ring.

7. The combined power transmission and drive unit (1) according to claim 1, wherein the controlling element (29) is supported on the first clutch part (19E) of the selectable clutch device (19).

8. The combined power transmission and drive unit (1) according to claim 1, wherein the power transmission unit (9) comprises a hydrodynamic component (10) and a device (12) for at least partial bypass of the power flow via the hydrodynamic component (10) disposed between the input (E) and the output (A) of the power transmission unit (9).

9. The combined power transmission and drive unit (1) according to claim 8, wherein the hydrodynamic component (10) is formed as a hydrodynamic rotation speed/torque converter (11) or as a hydrodynamic clutch.

10. The combined power transmission and drive unit (1) according to claim 8, wherein the power transmission unit (9) is formed as a dual-duct unit.

11. The combined power transmission and drive unit (1) according to claim 8, wherein the power transmission unit (9) is formed as a triple-duct unit.

12. The combined power transmission and drive unit (1) according to claim 1, wherein the at least two prime movers are selectively alone or connected together with the transmission.

13. The combined power transmission and drive unit (1) according to claim 12, wherein the first prime mover (3) is an internal combustion engine (4) and the second prime mover (5) is an electrical machine (6) that is operable either as a motor or as a generator.

14. A combined drive and power transmission unit, comprising:
- a torque converter with a pump;
- a friction clutch including:
  - a first clutch part;
  - a second clutch part fixedly connected to the pump and arranged to receive torque from at least two prime movers;
  - a first plurality of clutch plates with respective radially inner portions engaged with the first clutch part;
  - a second plurality of clutch plates with respective radially outer portions engaged with the second clutch part;
  - a piston element axially displaceable to close the clutch; and,
  - a control element connected to the piston element and including a radially outermost end in a pressure-tight engagement with the piston element;
- a plate connected to the second clutch part such that rotation of the plate is locked to rotation of the second clutch part; and,
- a connection element, separate from the piston element and the control element, disposed between the piston element and the plate in a direction parallel to an axis of rotation for the unit, and connected to the piston element and the plate to force the rotation of the piston element to lock with the rotation of the plate.

15. The combined power transmission and drive unit (1) according to claim 14, wherein the controlling element (29) is connected non-rotatably with a clutch hub (25).

16. A combined drive and power transmission unit, comprising:
- a torque converter with a pump;
- a friction clutch including:
  - a first clutch part;
  - a second clutch part fixedly connected to the pump and arranged to receive torque from at least two prime movers;
  - a first plurality of clutch plates with respective radially inner portions engaged with the first clutch part;
  - a second plurality of clutch plates with respective radially outer portions engaged with the second clutch part;
  - a piston;
  - a control element including a radially outermost end in a pressure-tight engagement with the piston; and,
  - a spring element:
    - fixedly connected to the control element so that rotation of the spring element is locked to rotation of the control element; and,
    - in contact with the piston such the spring element is independently rotatable with respect to the piston.

* * * * *